Jan. 22, 1935.  H. FELDMEIER ET AL  1,988,548
LIQUID HEATER
Filed April 28, 1934  2 Sheets-Sheet 1
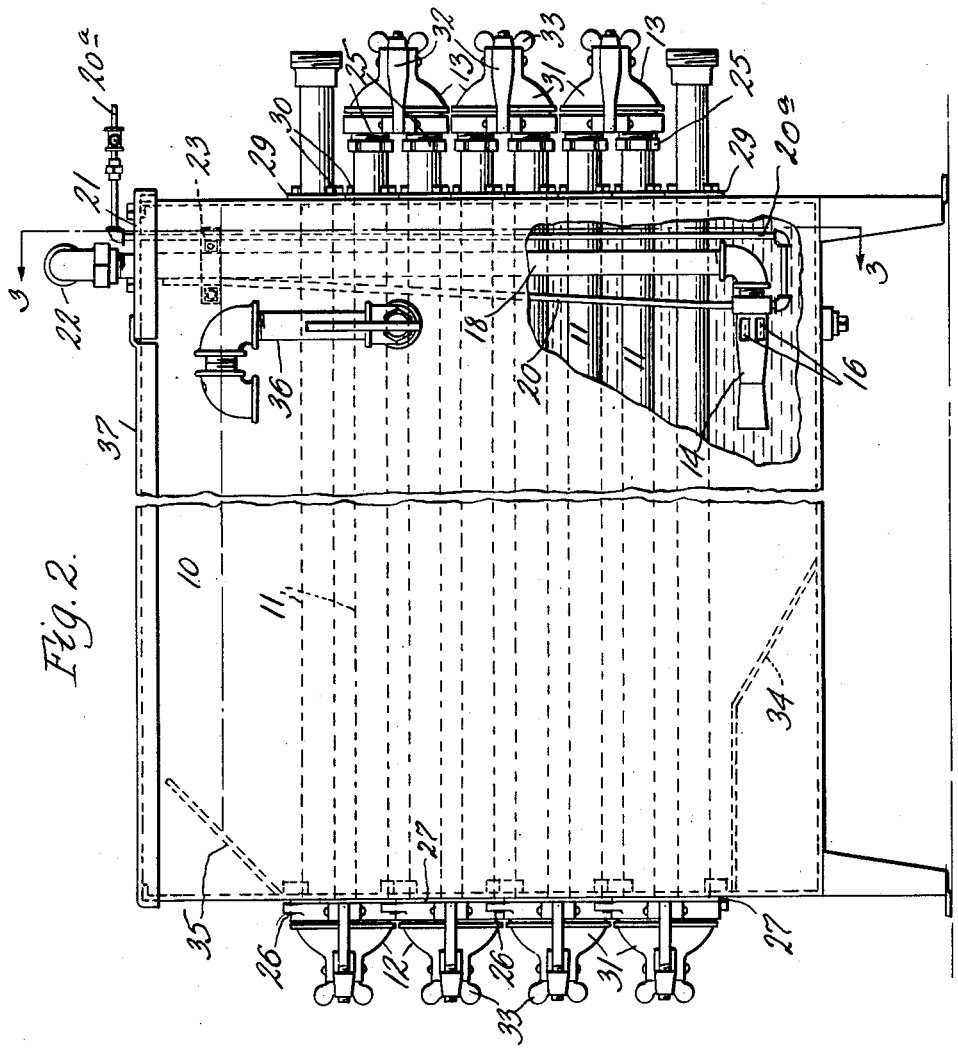
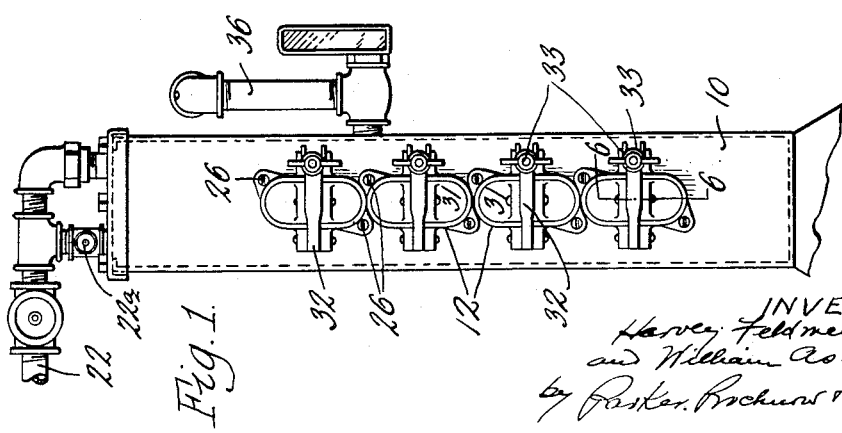
INVENTORS.
Harvey Feldmeier
and William Aolte
by Parker, Buchwart & Farmer
ATTORNEYS.

Jan. 22, 1935.   H. FELDMEIER ET AL   1,988,548
LIQUID HEATER
Filed April 28, 1934   2 Sheets-Sheet 2
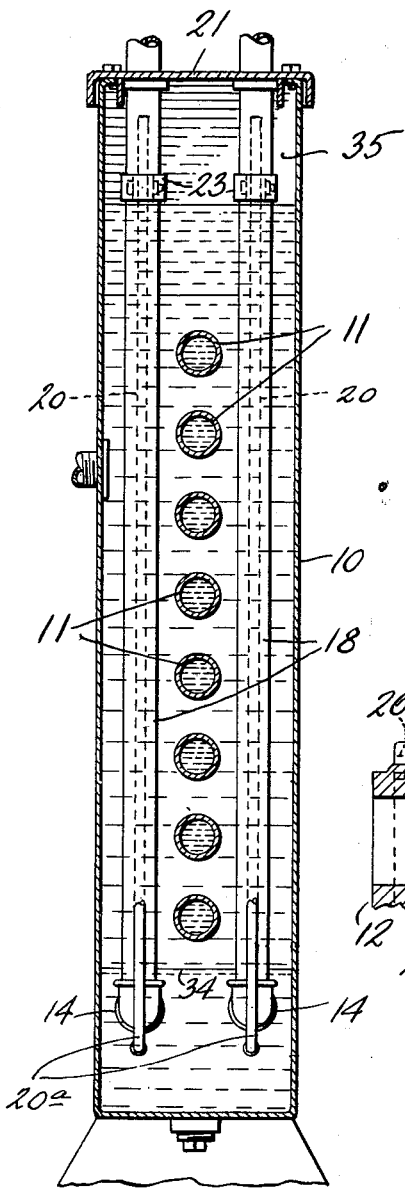
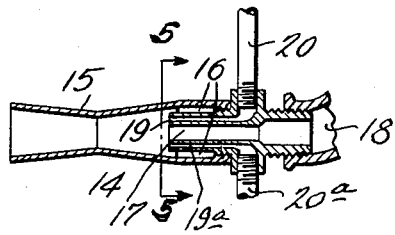
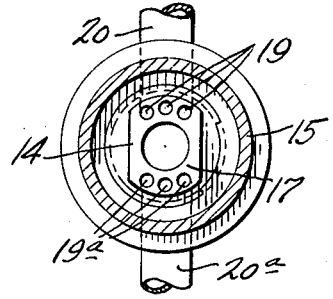
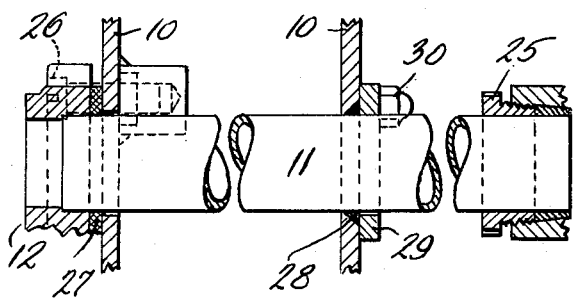
INVENTORS
Harvey Feldmeier
and William Aske
by Parker, Brockhorst & Farmer
ATTORNEYS Patented Jan. 22, 1935

1,988,548

UNITED STATES PATENT OFFICE 1,988,548

LIQUID HEATER

Harvey Feldmeier and William Astle, Little Falls, N. Y., assignors to Cherry-Burrell Corporation, Little Falls, N. Y., a corporation of Delaware Application April 28, 1934, Serial No. 722,957

11 Claims. (Cl. 257—64)

This invention relates to liquid heaters, and more particularly to heaters suitable for heating liquids such as milk, in which the milk flows through a pipe coil or bank of tubes submerged in a body of heating water or liquid in a box or tank.

Heaters of this character having submerged coils for heating the milk or liquid flowing through the coils were used many years ago for preheating the milk to temperatures suitable for treatment in cream separators and other apparatus. However, when improved separators and other treating apparatus having greatly increased capacities were introduced, it was found that the preheaters of this submerged coil type as then constructed, did not have the requisite capacities to supply the milk at the required temperatures in the increased volumes suited to the enlarged capacities of the improved separators and other apparatus, and such preheaters were supplanted by other types of heaters, such for example, as the double surface drum type, having larger capacities. Later, as the separator capacities grew still larger, the drum type of heater was found inconvenient and objectionable on account of its necessary bulk, and various types of tubular heaters such, for example, as the internal or double tube type, in which the tubes for the milk and heating medium respectively are arranged one within another, have been used. While such internal or double tubular heaters are efficient and extensively used at the present time, especially in the pasteurization of milk, where close temperature control is required with but a small spread between the temperature of the heating medium and the final milk temperature, these internal or double tube heaters are much more expensive than a heater according to the present invention, and for this reason their use is costly and undesirable for uses for which the heater of this application is adapted and desirable.

One purpose of our invention is to provide a heater of compact, simple and inexpensive construction but which has a wide range of capacities and will be efficient and economical in use.

Other objects of the invention are to construct a heater so as to insure intense circulation and intimate contact of the heating medium or water with all portions of the heating coil; also to construct a heater so as to obtain a high degree of efficiency and a high rate of heat exchange between the heating medium or water and the milk or liquid being heated; and also to provide a heater for liquids such as milk, which has the other features of advantage and improvement hereinafter described and set forth in the claims.

For the sake of brevity and clearness of description, the terms "milk" and "water" are employed in the specification to designate respectively the liquid to be heated and the liquid heating medium, but it is not thereby intended to restrict the invention to use with these particular mediums or liquids.

In the accompanying drawings:

Fig. 1 is an end elevation of a liquid heater embodying our invention.

Fig. 2 is a side elevation thereof, the tank being partly broken away to show the parts within the same.

Fig. 3 is a transverse, sectional elevation thereof on line 3—3, Fig. 2, but on an enlarged scale.

Fig. 4 is a longitudinal section of the steam ejector or device for circulating and heating the water.

Fig. 5 is a transverse section thereof on an enlarged scale on line 5—5, Fig. 4.

Fig. 6 is a sectional elevation showing the means for sealing the holes through which the tubes pass through the walls of the tank, said section being taken on line 6—6, Fig. 1, and also showing the connections between the tubes and the returns.

10 represents a box or tank adapted to contain a body of water in which a heating coil or bank of tubes 11 for the milk is submerged. As shown, this coil consists of a bank of horizontal tubes arranged one above another and extending through opposite ends of the tank and connected externally of the tank by returns or connections 12 and 13 which join the tubes 11 so as to form a continuous coil or conduit for the milk.

The tank 10 is of elongated, narrow, rectangular shape in horizontal cross section and of a depth depending upon the number of tubes in the coil or bank, the tank being of considerable length in the direction of the length of the tubes or coil and having its side walls disposed relatively close to the opposite sides of the coil or bank of tubes, so that the body or column of water in which the tubes are submerged is long, deep and thin and conforms closely to the form of the coil. For example, in a heater in which the coil is composed of a single bank of tubes of approximately 1½ inches outside diameter, the tank is preferably approximately 6 feet long and 6 inches wide. Its height depends upon the number of horizontal tubes in the coil or bank, the tank being high enough to provide water spaces both below and above the bank of tubes.

Water fills the tank to a level above the uppermost tube of the coil and this water is heated and actively circulated so as to sweep over the surfaces of all of the tubes of the coil by one or more steam ejectors or fluid-operated water heating and circulating devices 14. Preferably two of these ejectors or devices are employed and are located in the tank at one narrow end thereof below and at opposite sides of the coil and are arranged so as to discharge lengthwise of the tank or coil toward the opposite end of the tank. In the operation of the heater, these ejectors 14 produce an active circulation of the water in the tank lengthwise in the lower portion of the tank along the lower tubes of the coil toward the far end of the tank, upwardly in the far end of the tank, then back along the tubes in the upper portion of the tank and downwardly in the end of the tank in which the ejectors are located.

Preferably, as shown, see Figs. 4 and 5, each of the ejectors or devices 14 comprises an outer, double flaring or Venturi tube 15 having an open discharge end and provided near its inner end with lateral inlet openings 16 for the water, and a steam discharge nozzle 17 which projects into the inner end of the tube 15 and is connected with a steam supply pipe 18. The discharge nozzle 17 is also preferably provided with one or more longitudinal air discharge passages 19 and cold water discharge passages 19a, three of each being shown, connected respectively with an air inlet pipe 20 and a water pipe 20a. The steam pipes 18 preferably extend upwardly in the tank from the two ejectors 14 at opposite sides of the bank of tubes 11, pass through a top or cover panel 21, removably secured on the top of the tank, and are connected to a valve controlled steam supply line or pipe 22, the pipes 18 being secured in and supported by the top panel 21. The steam pipe 18 leading to one ejector 14 is also preferably equipped with a valve 22a, so that when operating at low capacities, one ejector can be shut off; this is for the reason that better circulation results with only one ejector working when the amount of steam discharged is small. The air pipes 20 also preferably extend upwardly from the ejectors 14 to points above the level of the water in the tank 10, the open, upper ends thereof, and the water pipes 20a being preferably fastened, as by a collar 23, to the upper portion of the adjacent steam pipe 18. The removable panel 21 with the pipes and ejectors carried thereby forms a removable unit which can be readily placed in position and removed.

In the operation of the heater, the steam supplied to the ejectors 14 heats the water in the tank and causes an active circulation of the same in the direction explained. The suction created by the condensation of the steam in the ejectors causes the air to be sucked in through the air pipes and mix with the water and steam and discharge from the ejectors with the water. It has been found in the practical use of the apparatus that the ejectors 14, constructed as described, function efficiently, and that the discharge of the air with the water not only reduces the noise of operation of the ejectors, but in addition, materially intensifies the circulation of the water under a wide range of pressures. When heating milk to high temperatures and carrying water temperatures above 180°, it quiets the jets to introduce, in addition to the air, small streams of relatively cold water, which help condense the steam in the ejectors. This water is introduced similarly to the air through the small passages shown in Figs. 4 and 5, in the ejector nozzle 17, the water being controlled by suitable valves on the water inlet pipes 20a. The active circulation, or convection, in both the milk tubes and in the body of water surrounding them results in a very high rate of heat exchange between the water and milk and a high efficiency of the apparatus, notwithstanding its exceedingly simple, compact, and inexpensive design.

In the preferred construction of the apparatus shown in the drawings, the tubes 11 are permanently secured at one end thereof, as by soldering, to the returns or connections 12 at one end of the heater, while the opposite ends of the tubes are removably attached to the returns at the opposite end of the heater. This construction enables the two tubes, which are fixed to each return 12, to be passed through the holes in the end walls of the tank and then removably connected, as by screw packing glands 25 of known construction, to the returns 13 at the opposite end of the heater. The returns 12 to which the tubes are permanently fixed are preferably secured to the adjacent end wall of the tank by bolts or screws 26, with suitable packing gaskets 27 interposed between the bases of the returns 12 and the wall of the tank to seal the holes in the wall through which the tubes pass. The holes in the opposite end wall of the tank through which the tubes pass can be sealed by suitable packing gaskets 28 compressed between the wall and clamp plates 29 surrounding the tubes and secured, as by bolts 30, to the tank wall.

The returns 12 and 13 are provided with the usual hinged or movable caps 31 releasably secured in closed position, as by clamping levers 32 and nuts 33, to permit the caps to be opened for cleaning the tubes 11.

An inclined plate or deflector 34 is shown in the lower portion of the tank 10 adjacent the end thereof opposite that at which the ejectors 14 are located and another inclined deflector or plate 35 is shown in the upper corner of the same end of the tank. The plate 34 acts to direct water upwardly at this end of the tank and the upper deflector 35 directs the return of the water toward the end of the tank where the ejectors are located.

36 represents a goose neck overflow pipe connected with the upper portion of the tank for determining the level of the water in the tank and preventing the water from rising too high in the tank, and 37 indicates a removable cover affording access to the tank.

We claim as our invention:

1. A liquid heater comprising a horizontally narrow elongated tank containing a body of water, tubes submerged in said water and extending lengthwise of the tank one above another and connected to form a coil for the passage of a liquid to be heated, the dimensions of the tank being such that said body of water is thin and deep and conforms relatively closely to the form of the coil, and a device constructed and arranged to discharge heated water into one narrow end of the tank in a direction toward the opposite end and cause the water in the tank to circulate lengthwise of part of the tubes of the coil and return lengthwise of other tubes of the coil.

2. A liquid heater comprising a horizontally narrow elongated tank containing a body of water, tubes submerged in said water and extending lengthwise of the tank one above another and connected to form a coil for the passage of a liquid to be heated, the dimensions of the tank being such that said body of water is thin and deep and conforms relatively closely to the form of the coil, and a device constructed and arranged to discharge heated water into the lower portion of one narrow end of the tank in a direction toward the opposite end and cause the water in the tank to circulate lengthwise of the lower part of the coil, upwardly in the far end of the tank and return lengthwise of the upper part of the coil.

3. A liquid heater comprising a horizontally narrow elongated tank containing a body of water, tubes submerged in said water and extending through the tank lengthwise thereof one above another and connected externally of the tank to form a coil for the passage of a liquid to be heated, the dimensions of the tank being such that said body of water is thin and deep and conforms relatively closely to the form of the coil, and a fluid ejector located in the lower portion of one narrow end of the tank and arranged to discharge in a direction lengthwise of said tubes and cause the water in the tank to circulate lengthwise of the lower tubes of the coil, upwardly in the far end of the tank and then back lengthwise of the upper tubes of the coil.

4. A liquid heater comprising a horizontally narrow elongated tank containing a body of water, tubes submerged in said water and extending through the tank lengthwise thereof one above another, connectors arranged externally of the tank connecting said tubes to form a coil for the passage of a liquid to be heated and constructed to open to afford access to the interior of the tubes, the dimensions of the tank being such that said body of water is thin and deep and conforms relatively closely to the form of the coil, and a fluid ejector located in the lower portion of one narrow end of the tank and arranged to discharge in a direction lengthwise of said tubes and cause the water in the tank to circulate lengthwise of the lower tubes of the coil, upwardly in the far end of the tank and then return lengthwise of the upper tubes of the coil.

5. A liquid heater comprising a horizontally narrow elongated tank containing a body of water, tubes submerged in said water and extending lengthwise of the tank one above another and connected to form a coil for the passage of a liquid to be heated, the dimensions of the tank being such that said body of water is thin and deep and conforms relatively closely to the form of the coil, and fluid ejectors located in the lower portion of one narrow end of the tank at opposite sides of said coil and arranged to discharge in a direction toward the opposite end of the tank for heating and circulating the water in the tank.

6. A liquid heater comprising a horizontally narrow elongated tank containing a body of water, tubes submerged in said water and extending lengthwise of the tank one above another and connected to form a coil for the passage of a liquid to be heated, the dimensions of the tank being such that said body of water is thin and deep and conforms relatively closely to the form of the coil, steam ejectors located in the lower portion of one narrow end of the tank at opposite sides of said coil and arranged to discharge in a direction toward the opposite end of the tank for heating and circulating the water in the tank, steam supply pipes connected to said ejectors and extending upwardly therefrom in the tank, and a removable support for said pipes at the top of the tank.

7. A liquid heater comprising a horizontally narrow elongated tank containing a body of water, tubes submerged in said water and extending lengthwise of the tank one above another and connected to form a coil for the passage of a liquid to be heated, the dimensions of the tank being such that said body of water is thin and deep and conforms relatively closely to the form of the coil, and water heating and circulating devices located at opposite sides of said coil at one narrow end of the tank and constructed to circulate the water in the tank in a direction lengthwise of a part of the tubes of the coil and then back lengthwise of other tubes of the coil.

8. A liquid heater comprising a horizontally narrow elongated tank containing a body of water, tubes submerged in said water and extending lengthwise of the tank one above another and connected to form a coil for the passage of a liquid to be heated, the dimensions of the tank being such that said body of water is thin and deep and conforms relatively closely to the form of the coil, and water heating and circulating devices located at opposite sides of said coil at one narrow end of the tank and constructed to circulate the water in the tank in a direction lengthwise of a part of the tubes of the coil and then back lengthwise of other tubes of the coil, said heating and circulating devices being connected and removably mounted to adapt them to be placed in and removed as a unit from the heater.

9. A liquid heater comprising a horizontally narrow elongated tank containing a body of water, tubes submerged in said water and extending through the tank lengthwise thereof one above another, connectors arranged externally of the tank connecting said tubes to form a coil for the passage of a liquid to be heated and constructed to open to afford access to the interior of the tubes, said tubes being fixedly attached to the connectors at one end of the tank and removably attached to the connectors at the opposite end of the tank, thereby enabling the latter connectors to be attached after the tubes have been passed through holes therefor in the end walls of the tank, and means for circulating the water in the tank first lengthwise of a part of the tubes of the coil and then lengthwise of other tubes of the coil.

10. A liquid heater comprising a horizontally narrow elongated tank containing a body of water, tubes submerged in said water and extending lengthwise of the tank one above another and connected to form a coil for the passage of a liquid to be heated, the dimensions of the tank being such that said body of water is thin and deep and conforms relatively closely to the form of the coil, and a steam ejector arranged at one narrow end of the tank to discharge in a direction lengthwise of said tubes toward the opposite end of the tank, said ejector having an air suction passage and connections whereby the ejector discharges both water and air.

11. A liquid heater comprising a horizontally narrow elongated tank containing a body of water, tubes submerged in said water and extending lengthwise of the tank one above another and connected to form a coil for the passage of a liquid to be heated, the dimensions of the tank being such that said body of water is thin and deep and conforms relatively closely to the form of the coil, a steam ejector arranged at one narrow end of the tank to discharge in a direction lengthwise of said tubes toward the opposite end of the tank, said ejector having an air suction passage and connections whereby the ejector discharges both water and air, and means for supplying cold water under regulation to said ejector.

HARVEY FELDMEIER.
WILLIAM ASTLE.